United States Patent Office 3,408,290
Patented Oct. 29, 1968

3,408,290
RECOVERY OF WATER FROM SALINE SOLUTION BY SOLVENT EXTRACTION
Edward G. Scheibel, 75 Harrison Ave., Montclair, N.J. 07042
Filed Aug. 4, 1966, Ser. No. 570,330
10 Claims. (Cl. 210—22)

The present invention relates to a process for solvent extraction of saline water with a solvent which has a large change in solubility at different temperatures.

Such solvents, e.g., triethylamine are known, and indeed have been suggested to the art for desalination by extraction techniques. Reference is made to 3,088,909 and 3,177,139 as representing the state of the prior art. Strictly speaking the present invention represents an improvement thereover.

Briefly stated, the present process involves extraction of an aqueous saline solution like sea water with such a solvent at a temperature for optimum extraction of water from the aqueous saline solution, followed by heating the solvent extract to effect phase separation. The heating step is effected by direct countercurrent contact between the extract and recycled desalinated water. Similarly (as part of the extraction step), the saline raffinate is heated by direct countercurrent contact with heated recycled solvent. Direct countercurrent contact heating so associated with extraction results in a saline raffinate having relatively little solvent therein, and a separated desalinated water phase having relatively little solvent therein. Thereby the heating load in the subsequent solvent recovery system is reduced to a relatively low level.

According to practice of this invention the bulk of the solvent recirculates between the extraction step and the solvent heating step (without ever entering the solvent recovery systems) being alternately heated in the solvent heater to release desalinated water therefrom. Then cooled in the extractor against saline raffinate so that it might once again extract water from saline feed solution. The desalinated water released from the extract exists essentially at extraction temperatures from the solvent water. Heat added at the solvent heating step and removed at the extraction step (in the heated saline raffinate) is supplied by heating and recycling back to the solvent heater a portion of the water output from the solvent heater.

Since the extractor and solvent water must operate under limitations imposed by the need for a thermal balance, a distinguishing characteristic of the present system is that the ratio of solvent to saline raffinate is fixed. This makes the fraction of water extracted from the saline feed invariant. Processes which operate isothermally have no such restriction since any desired degree of water removal can be obtained by selecting the appropriate solvent ratio.

The limitation imposed on the present and prior art saline water extraction systems alike to produce essentially salt-free water (e.g., less than 500 part per million of salt) may make desirable use of a water reflux in the extraction step. Adding a water reflux to the invariant character of the present system makes multicycle operation more advantageous than single cycle operation on occasion, multicycle operation is expressly contemplated for practice of the present invention, particularly to desalinate brackish water.

For a better understanding of the invention reference is now made to the attached drawings wherein certain exemplary preferred embodiments of practice thereof are shown in which.

Figure 1:
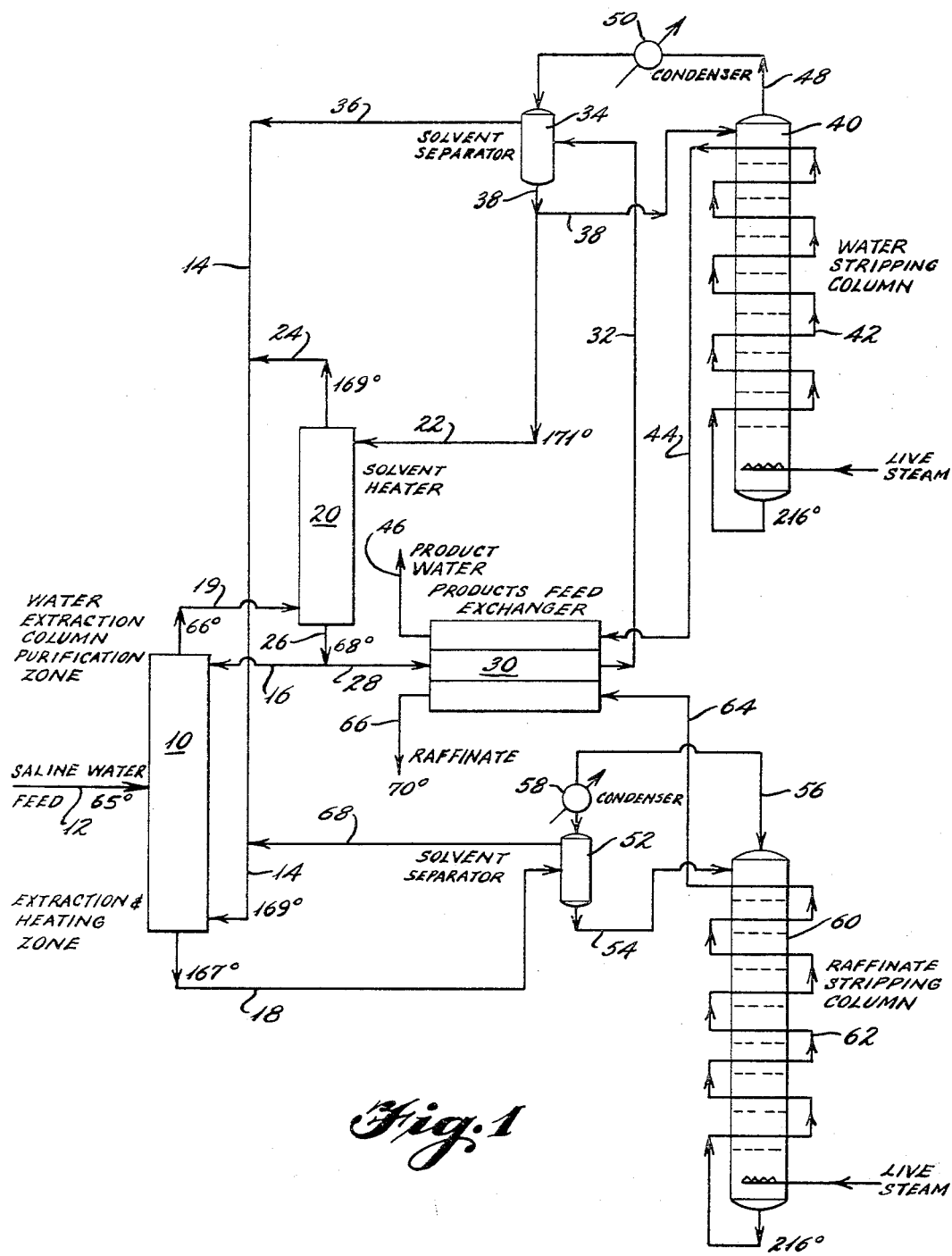
FIG. 1 is a flow sheet of a single cycle saline water purification system.

To still further faciltate understanding of the present invention, the embodiments illustrated in the drawing will be described in the terms of the flow rates and temperature levels of an actual examplary separation. Thus the system of FIG. 1 is adapted to desalinate sea water available at 65° F. by extraction with triethylamine in a plant having a product capacity of 100,000 gallons per day (g.p.d.).

The sea water (10,200 gallons per hour) enters extraction column 10 from feed line 12 at some midpoint thereon and passes downwardly countercurrent to triethylamine (heated to 169° F.) which enters via line 14 at the bottom of extraction column 10. The solvent feed (10,-570 g.p.h.) is in thermal balance with the saline raffinate leaving at line 18 heating same to a raffinate outlet temperature of 167° F. in its countercurrent extracting passage up through column 10. Desalinated water reflux (2130 g.p.h.) at 68° F. is introduced via line 16 to the top of extraction column 10.

The conditions in extraction column 10 are set thereby to effect a solvent stripping action on the raffinate below the sea water feed point so that the heated raffinate leaving column 10 via line 18 (7,000 g.p.h.) contains little solvent therein (e.g., about 2%). On the other hand, the temperature conditions in the upper rectifying portion of column 10 above the feed point are essentially isothermal (66° F.) at a level for maximum extraction efficiency for triethylamine. The solvent phase leaving via line 19 (15,900 g.p.h.) at 66° F. contains therein large quantities of dissolved essentially salt free water. The extract passes from extraction column 10 via line 19 to solvent heater column 20 wherein it is heated by direct countercurrent extraction contact with recycled desalinated water entering from line 22 at 171° F. (6210 g.p.h.). Heating effects phase separation of the triethylamine solvent solution releasing the extracted water so that the heated solvent stream (169° F.) leaving the top of solvent heater column 20 via line 24 (7500 g.p.h.) has little water therein. The heated solvent is recycled back via line 14 to extraction column 10.

The aqueous phase leaving the bottom of the solvent heater 20 via line 26 (14,610 g.p.h.) has been cooled to 68° F. The material balance in solvent heater column 20, like that in extraction column 10, is based upon a thermal balance. Only enough heated water is recycled to the top of column 20 to thermally balance the solvent heating load. The desalinated water output of solvent heater column 20 includes the wet water product and the water recycle stream.

A small portion of the desalinated water output is refluxed via line 16 back to the extraction column 10 (2130 g.p.h.) while the balance of the desalinated water (12,480 g.p.h.) passes via line 28 into products-feed heat exchanger 30 wherein it is heated by indirect heat exchange to a suitable temperature for further solvent separation and passage to a water stripping distillation (e.g., 171° F.).

From products feed heat exchanger 30 the desalinated water passes via line 32 to solvent separator 34 wherein it is allowed to separate (e.g., by gravity) into two phases of a substantially water free solvent phase and a substantially solvent free water phase. The solvent phase is drawn off (at 171° F.) via line 36 for recycle to extraction column 10 (2110 g.p.h.). The water content of the solvent phase is immaterial since the solvent is being recycled. The water phase which passes from solvent separator 34 via line 38 has dissolved therein less than about 2% solvent and must be treated to remove and recover the solvent.

The water phase removed from the solvent separator 34 via line 38 is divided with a substantial portion thereof (6120 g.p.h.) being recycled via line 22 to solvent heater 20. The rest of the desalinated water (4300 g.p.h.) is sent directly to the top of water stripping column 40, where its solvent content is stripped as a triethylamine water azeotrope, by the use of low pressure live steam. Advantageously water stripping column 40 is made of the general structure indicated by FIG. 1 where heat exchange surfaces 42 are provided internally of distillation column 40 to keep in the column the sensible heat from the steam stripped desalinated water product (4160 g.p.h. at 216° F.). Use of heat exchange elements 42 in association with distillation column 40 is more efficient and therefore involves less stripping steam than would provision of an external heat exchanger to exchange the water product (not shown) bottoms against the column feed in line 38.

In any event, the steam stripped water product passes from the still at 179° F. via line 44 to the products-feed exchanger 30 there being cooled to 70° F. by heat exchange against the desalinated water output from solvent heater 20. The desalinated water product leaves the system via line 46 (4160 g.p.h.) free of solvent and with less than about 500 parts per million of salt.

The steam triethylamine azeotrope taken overhead of distillation column 40 via line 48 is condensed, condenser 50, then passed into solvent separator 34 for phase separation comingled with the heated water from line 32.

The saline raffinate leaving extraction column 10 already heated (167° F.) passes through a solvent recovery sequence similar to that of the heated water product, passing via line 18 to a solvent separator 52 where phase separation occurs. The water phase (6140 g.p.h.) passes from solvent separator 52 via line 54 to raffinate stripping column 60 where it is steam distilled to remove overhead at 56 the triethylamine-steam azeotrope. The azeotrope is condensed in condenser 58, and passes into solvent separator 52. Distillation in column 60 also is illustrated with the preferred expedient of heat exchange surfaces 62 internally of the column in lieu of an external heat exchanger preheat of raffinate distillation feed against the steam distilled raffinate bottoms product. In any event the steam distilled saline raffinate passes at 179° F. via line 64 to the products-feed exchanger 30 wherein it is cooled to an outlet temperature of 70° F. (6040 g.p.h.) and discharged from the system at 66.

The solvent phase from solvent separator 52 is recycled via line 68 to join the other solvent recycle streams and from part of the heated solvent in line 14 fed to extraction column 10.

In the above description of the system of FIG. 1, valves, pumps, and similar apparatus have been omitted for sake of simplicity as have column and heat exchanger details. It is to be understood that such conventional auxiliary features are present and are to be provided as required in accord with the skill in the art. Antiscaling pretreatment of the sea water has not been described but may be effected if found needed to avoid deposition of calcareous deposit in the equipment.

Although the above described system has been described in extensive detail, it should be understood that it represents only preferred practice. Individual installations will deviate therefrom insubstantially because of special circumstances. Thus for example the cost and availability of steam for distillation columns 40 and 60 will determine the advisability of undertaking the expenses involved in providing heat exchange surfaces 42 and 62 internally of the distillation column. Similarly operational variations in extraction column 10 depend on the water product purity required and cost considerations. If a reflux ratio of 0.5 as given above is used, approximately 25 extraction stages are required above the saline feed entry point (line 12) and the ultimate desalinated water yield is about 40 percent of the saline feed. On the other hand, if a reflux ratio of 1.0 is employed only 7 extraction stages are required but the yield will be reduced to about 35%.

The invariant characteristics imposed by thermal considerations on the present extraction system may, on occasion, make a multicycle operation more economic than the single cycle system illustrated in FIG. 1. Thus, when a reflux ratio of 0.5 is employed the salt concentration of the saline raffinate increases only 1.5-fold and the raffinate may then still represent an attractive source of fresh water. For sea water about 6 cycles would provide an 11-fold increase in salt concentration in the raffinate approaching thereby saturation in the saline raffinate. The still lower salt content of brackish water makes multicycle operation particularly attractive.

The heat required to recover solvent from the product water and saline raffinate streams is always proportional to the feed. In the instances of triethylamine for solvent the heat amounts to about 7° F. of sensible heat. With a single cycle and a temperature difference of 8° F. between feed and product streams, the total heat duty is equivalent to 15° F. of sensible heat to the feed stream. A multicycle operation requires 8° F. of sensible heat to each raffinate processed but no additional solvent recovery heat. In addition, the low temperature of operation permits the reuse of the solvent recovery heat to the condensers (at a temperature of about 170° F.) for the sensible heat requirement of the second, third, etc., cycles. In large scale plants a five or a six cycle process may operate with a total heat equivalent to 15° F. of sensible heat to the feed, to obtain a yield of 64% product water, in contrast to the single cycle yield of 40%.

Figure 2:
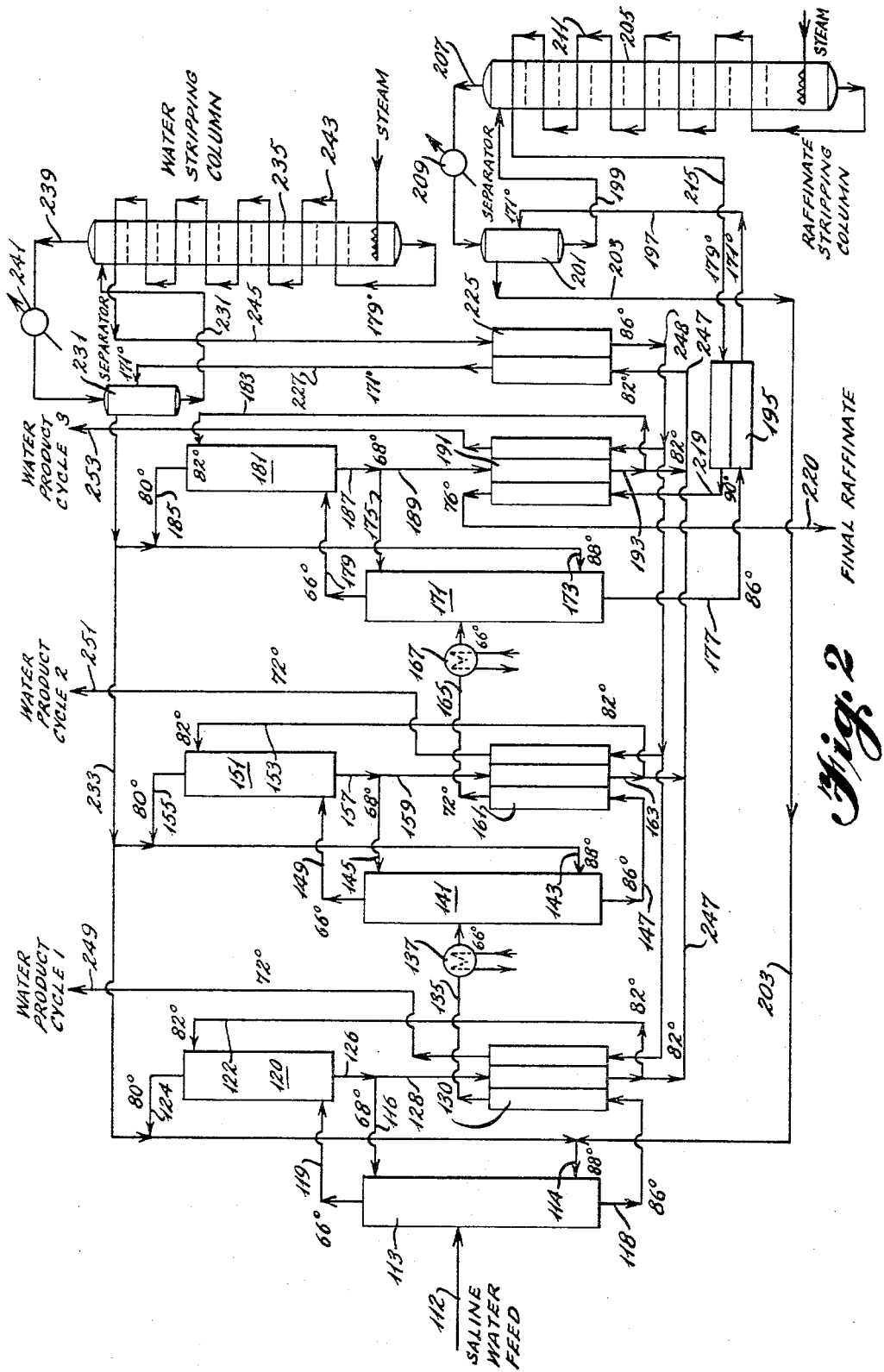
FIG. 2 is a flow sheet of a multicycle saline water purification system.

FIG. 2 illustrates a three cycle plant with each successive cycle increasing the salt concentration 1.5-fold. Some of the adavntages of the multicycle process are readily apparent from FIG. 2. First the temperature differential in each solvent heater 120, 151, 181 is smaller so that the individual extractor columns may be made smaller and with less stages than the single cycle solvent heater. Second, only the final cycle raffinate need be stripped solvent. FIG. 2 shows three cycles of extraction 113, 141, 171 each of which operate between a lower limit of 66° F. for the triethylamine extract solution and 86° F. for the saline raffinate solution.

Thus, the sea water feed entering the first extraction column 113 from feed water line 112 enters at 65° F. Recycled warmed solvent enters the bottom of extraction column 113 from line 114 at 88° F. while desalinated water reflux to the top of extraction column 113 via line 116 enters at 68° F. Below the feed point of line 112 saline raffinate passes through the stripping portion of extraction column 113 in countercurrent direct heating contact to the solvent, exchanging heat therewith leaving ultimately via line 118 heated to 86° F. The upper or rectifying portion of extraction column 113 (above the feed point of line 112) operates essentially isothermally, the solvent extract phase leaving the top of extraction column 113 via line 119 exists at 66° F. and is then passed to solvent heater 120 where it is in direct countercurrent heating contact with recycled desalinated water entering from line 122 (at 82° F.). The warmed solvent leaves solvent heater column 120 via line 124 at about 80° F. for recycle back to extraction column 110 via line 114. The desalinated water output of solvent heater 120 leaving the bottom thereof via line 126 at 68° F. is split with one portion passing via line 116 back to extraction column 110 as the water reflux thereto, and the balance of the desalinated water passing via line 128 to products-feed heat exchanger 130. There the desalinated water is heated by indirect heat exchange against the saline raffinate from extraction column 113 via line 118 and a portion of the salt free product water to about 82° F. A part of the so warmed water is recycled via line 122 back to solvent heater 120 and the balance being sent on to line 247 for solvent recovery.

The saline raffinate output from cycle 1 has been cooled in products-feed heat exchanger 130 to 72° F., it then passes by way of line 135 and a cooler 137 (in which the raffinate is cooled to 66° F.) into the second cycle as the saline feed to extraction column 141. Recycled warmed solvent (at 88° F.) enters the bottom of extraction column 141 from line 143, while reflux water (at 68° F.) enters the top of extraction column 141 via line 145. The solvent extract solution leaving column 141 at 66° F. passes via line 149 to solvent heater column 151 wherein it passes in countercurrent direct heating contact with a warmed desalinated water recycle stream which enters the top at 82° F. via line 153. The warmed solvent leaving solvent heater column 151 at 80° F. by way of line 155 is recycled back to the cycle 2 extraction column 141. The desalinated water output leaves solvent heater extraction column 151 at 68° F. via line 157. A portion thereof is recycled via line 145 as the reflux to the cycle 2 extraction column 141 and the balance goes via line 159 to products-feed heat exchanger 161 wherein it is heated by indirect heat exchange to an outlet temperature of 82° F. against saline raffinate and portion of the salt free product water. The water warmed in products-feed exchanger 161 and exiting therefrom via line 163 in split with a portion being recycled via line 153 back to solvent heater 151 and the balance joining (line 247) the water product of cycle 1 for solvent recovery.

The saline raffinate leaving second cycle extraction column 141 at 86° F. via line 147 passes directly to the products-feed heat exchanger 161, being cooled therein to 72° F. then enters cycle 3 via line 165 and cooler 167 (cooled to 66° F.) to serve as the saline feed to the third cycle extraction column 171. In extraction column 171, the saline feed thereto is stripped by warmed solvent entering the bottom via line 173 at 88° F. Water reflux enters at the top of column 171 at 68° F. via line 175.

The extract phase leaving the top of extraction column 171 at 66° F. via line 179 is passed to the third cycle solvent heater 181 wherein it is contacted by recycled warm water entering at 82° F. via line 183. The solvent leaves solvent heater 181 at the top thereof via line 185 at 80° F. for recycle back to the cycle 3 extraction column 171, the water output leaves the bottom of the solvent heater column 181 at 68° F. via line 187. A portion of the desalinated water output is recycled via line 175 to serve as reflux in extraction column 171 and the balance passes via line 189 to the third cycle products-feed heat exchanger 191 wherein it is warmed from 68° F. to 82° F. by indirect heat exchange against saline raffinate and part of the salt free product water. The warmed water leaving heat exchanger 191 via line 193 is in part recycled via line 183 back to the solvent heater column 181, the balance joins the water product of cycles 1 and 2 in line 247 for solvent recovery.

It should be noted that the raffinate leaving the extraction column 171 at 86° F. of the last cycle is handled differently than it is in the first and second cycle. It passes in via line 177 to raffinate preheater heat exchanger 195 wherein it is heated from 86° F. to 171° F., at which temperature it passes via line 197 to a separator 201. In separator 201 solvent and water separate into two phases. The solvent released from the saline raffinate by heating in heat exchanger 195 is recycled at 171° F. via line 203 back to the first cycle to form part of the warm solvent feed entering extraction column 110 via line 114.

The water phase from separator 201 is passed by way of line 199 into the top of raffinate stripping column 205 wherein it is steam distilled to remove overhead the triethylamine-steam azeotrope, this overhead passing by way of line 207 through a condensor 209 to separator 201 where the condensed azeotrope is separated into the solvent and water phase.

As in the instance of the single cycle system a preferred practice is to provide the distillation column 205 with internal heat exchange surfaces indicated at 211 so that the steam stripped saline water raffinate bottoms are cooled from its bottoms temperature (e.g., 220° F.) internally of column 205 to 179° F. before actually leaving column 205 via line 215 for passage to raffinate preheater heat exchanger 195 where the saline raffinate final product is cooled to 90° F. From heat exchanger 195 the final saline raffinate product passes via line 219 through the product feed heat exchanger 191 of cycle 3 being cooled there to 76° F. and finally out of the system at 76° F. via line 220.

The salt free water product collected from all three cycles in water product line 247 passes to water preheater heat exchanger 225 wherein it is heated from 82° F. to 171° F. then by way of line 227 to separator 231 wherein phase separation takes place. The solvent phase leaves separator 231 via line 233 at 171° F. for recycle to the extractors 113, 141, 171 of all three cycles. One portion is drawn off line 233 at the third cycle to join the solvent recycle line 173 to extraction column 171. A second portion is drawn off at cycle 2 for passage in line 143 to the second cycle extraction column 141. The balance is passed through to the first cycle solvent line 114. The relative proportion of the recycled solvent drawn off from line 233 to each cycle is set for each cycle so that a thermal and material balance is obtained in extractors 113, 141, 171 against the saline raffinate.

The water phase from separator 231 is passed via line 237 to water stripping column 235 wherein it is steam distilled to pass overhead the triethylamine steam azeotrope, this overhead passing via line 239 and condenser 241 to separator 231 to join the water solvent mixture being phase-separated there. The steam stripped salt free water bottoms product passes through the internal heat exchange member 243 then out of distillation column 235 at 179° F. passing via line 245 to water preheater heat exchanger 225 wherein it is cooled to 86° F. The salt free product water leaving exchanger 225 by way of line 248 is split between cycles 1 and 2 and 3 with part going to each of heat exchangers 130, 161 and 191 to balance off the heat requirements therein. One portion of the salt free product water thus leaves heat exchanger 130 at 72° F. via line 249 as the water product of cycle 1; a second portion leaves heat exchanger 161 at 72° F. via line 251 as the water product of cycle 2; and the third portion leaves heat exchanger 191 via line 253 as the water product of cycle 3.

The exemplary systems illustrated in FIGS. 1 and 2 are presented for better understanding of the present invention, and numerous changes within the skill of the art will be made therein. For example, it may be noted that the steam solvent azeotrope passing overhead of the raffinate stripping steam distillation columns 60 and 205 is essentially salt free and therefore can be handled so that the aqueous portion thereof is added to the salt free water product rather than being lost by admixture with the saline raffinate.

While the above examples have been proposed in terms of triethylamine as the solvent, it should be appreciated that the present invention is not specifically limited to triethylamine as the solvent or even to the class of alkylamines disclosed in the previously referenced patents. While minor variations in the system must be made for particular solvent characteristics, theoretically any solvent whether a pure compound or a set of mixed solvents exhibiting minimum consolute temperatures may be used for practice of this invention where extraction takes place at a relatively low temperature and phase separation occurs at more elevated temperatures. Other desirable physical requirements for the solvent in decreasing order of importance are:

(1) Low solubility in heated water (preferably less than 2%),
(2) High volatility (preferably greater than water),
(3) Low critical solution temperature (preferably below the azeotrope boiling point, to reduce the temperature differential of the process and eliminate the need for pressure equipment),
(4) noncorrosive and inexpensive.

What is claimed is:

1. In solvent extraction for the recovery of water of reduced salt content by contacting an equeous saline solution with a solvent having a minimum consolute temperature where extraction is effected at one temperature and phase separation is effected at a more elevated temperature the improvement which comprises: extracting the aqueous saline solution by thermally balanced countercurrent direct extraction contact with heated solvent whereby the solvent contacted by the entering saline solution has been cooled to effective extraction temperature levels, thereafter heating the solvent extract phase to an elevated temperature by thermally balanced countercurrent direct extraction contact with heated desalinated water whereby the heated saline raffinate leaving the extraction step has a minimal solvent content dissolved therein and the heated solvent leaving the solvent heating step has minimal water dissolved therein, recycling the so heated solvent back to the extraction step for further contact with saline solution, reheating and recycling a portion of the now desalinated water output from the solvent heating step back thereto, and stripping the residual solvent content from the heated saline raffinate and from the water product, said water product being a further portion of the water output of the solvent heating step.

2. The process of claim 1 wherein a portion of the water output of thet solvent heating step is employed as reflux in the extraction step.

3. The process of claim 1 wherein the saline raffinate and the desalinated water product are steam distilled to strip out solved therefrom.

4. The process of claim 1 wherein triethylamine is employed as the solvent.

5. The process of claim 1 wherein the heated saline raffinate is subjected to phase separation to separate solvent therefrom, the so separated solvent being recycled back to the extraction step.

6. The process of claim 1 wherein the reheated and recycled portion of the desalinated water output from the solvent heating step is subject to phase separation to separate solved therefrom prior to recycle to said solvent heating step, and the so separated heated solvent is recycled back to the extraction step.

7. The process of claim 6 wherein the heated water subject to phase separation includes the water product, only part being recycled to the said solvent heating step and the remainder being steam distilled to strip out residual solvent therefrom.

8. The process of claim 1 wherein the saline solution is sequentially passed through a plurality of extraction and solvent heating cycles as defined in claim 1, the heated saline raffinate product of one cycle being cooled to extraction temperatures prior to passage into the extraction step of the next cycle.

9. The process of claim 8 wherein the saline raffinate from the last of the cycles is further heated then subjected to phase separation to separate solvent therefrom, the so separated solvent being recycled back to the first cycle extraction step.

10. The process of claim 8 wherein the wet desalinated water product from all cycles is combined then heated, thereafter subjected to phase separation, the so separated solvent being appropriately recycled in part to the extraction step of each cycle.

References Cited

UNITED STATES PATENTS 3,088,909   5/1963   Davison et al. _____ 210—22

MICHAEL E. ROGERS, *Primary Examiner.*